(12) United States Patent
Matiere

(10) Patent No.: US 6,701,688 B2
(45) Date of Patent: Mar. 9, 2004

(54) REINFORCING CAGE FOR AN ARMORED CONCRETE ELEMENT

(75) Inventor: Marcel Matiere, Aurillac (FR)

(73) Assignee: Societe Civile de Brevets Matiere (FR)

( * ) Notice: Subject to any disclaimer, the term of this patent is extended or adjusted under 35 U.S.C. 154(b) by 0 days.

(21) Appl. No.: 09/962,616

(22) Filed: Sep. 26, 2001

(65) Prior Publication Data

US 2002/0040558 A1 Apr. 11, 2002

(30) Foreign Application Priority Data

Sep. 26, 2000 (FR) .............................................. 00 12236

(51) Int. Cl.⁷ .............................................. E04H 12/00
(52) U.S. Cl. ........................ 52/649.2; 52/693; 52/654.1
(58) Field of Search .......................... 52/690, 693, 694, 52/649.1, 637, 650.3, 654.1, 649.2, 340, 730.2, 745.19; 249/48, 50, 18

(56) References Cited

U.S. PATENT DOCUMENTS

| | | | | |
|---|---|---|---|---|
| 870,588 A | * | 11/1907 | Rogers ...................... 52/648.1 |
| 2,112,949 A | * | 4/1938 | Bunker .......................... 52/318 |
| 3,131,791 A | * | 5/1964 | Davis, Jr. et al. .............. 52/364 |
| 4,333,293 A | * | 6/1982 | Jackson ........................ 52/692 |
| 4,432,178 A | * | 2/1984 | Taft .............................. 52/334 |
| 6,003,281 A | * | 12/1999 | Pilakoutas ................ 52/742.14 |
| 6,026,613 A | * | 2/2000 | Quiring et al. ................. 52/63 |

* cited by examiner

Primary Examiner—Carl D. Friedman
Assistant Examiner—Yaoko Slack
(74) Attorney, Agent, or Firm—Connolly Bove Lodge & Hutz LLP

(57) ABSTRACT

A molded concrete member has two facings, respectively active and passive, spaced from one another by a preselected distance, and between which is embedded a reinforcing cage. The cage has, on either side of a neutral axis, two layers, respectively active and passive, which are separated by a spacing. Each layer has at least one longitudinal solid bar of preselected cross-section, the spacing and the cross-section of the bars being determined in relation to loads to be applied, the two layers are respectively parallel to both facings of the molded element and are connected by transverse linking armoring.

6 Claims, 3 Drawing Sheets

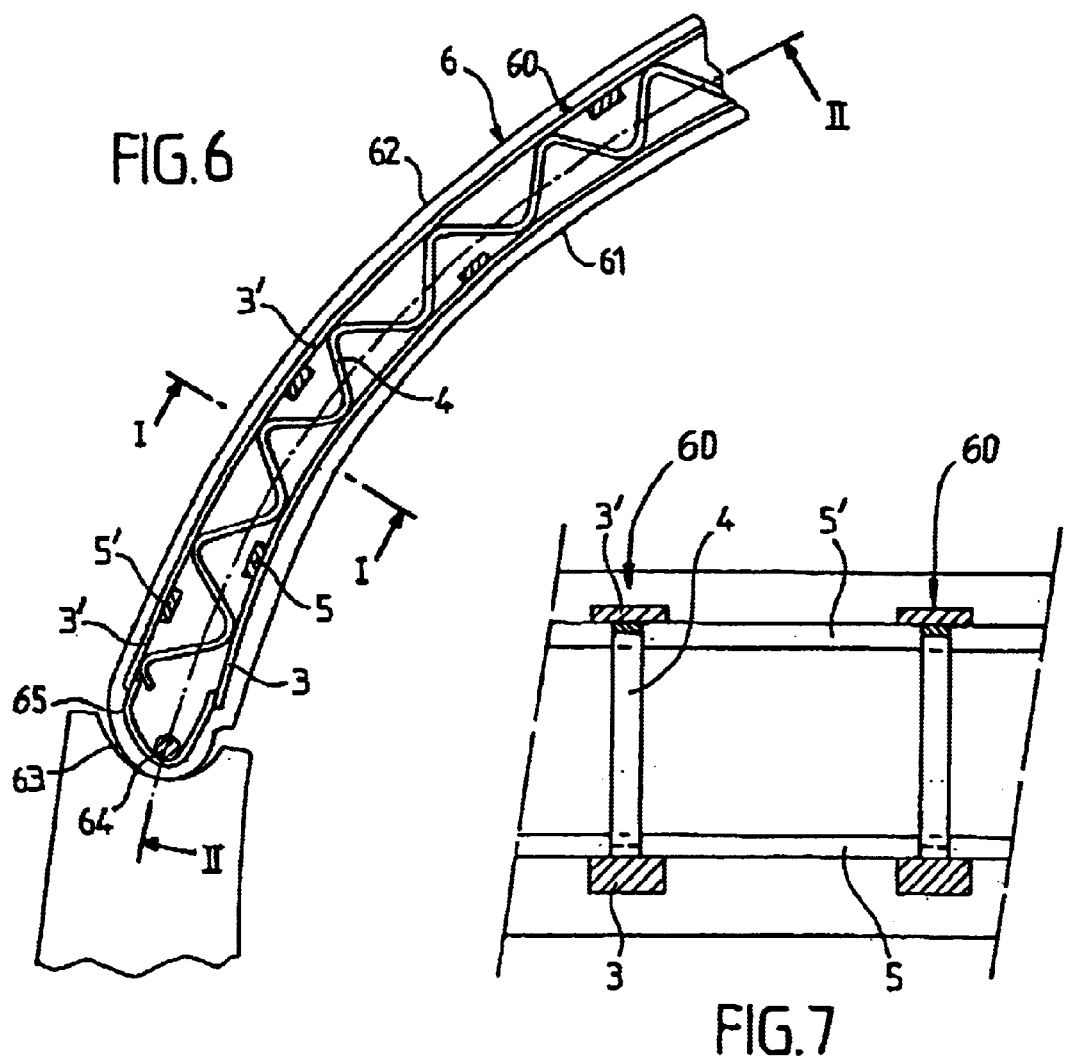
FIG.6
FIG.7
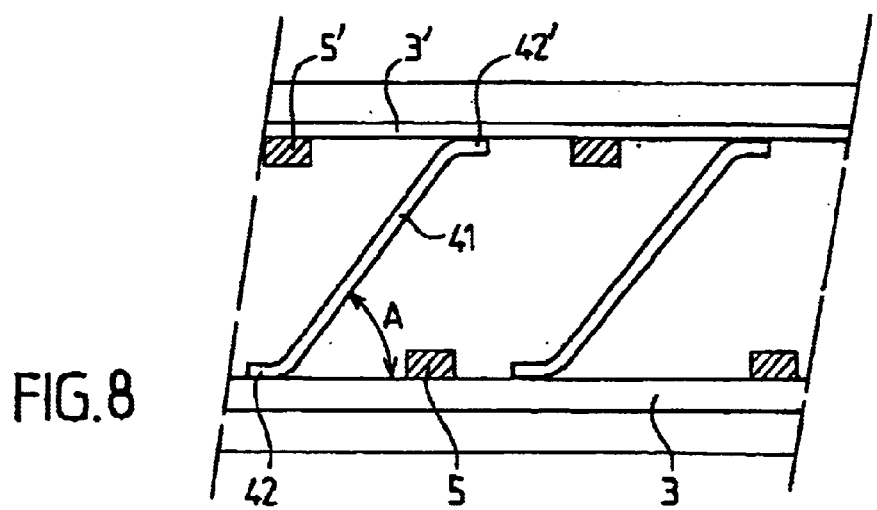
FIG.8

US 6,701,688 B2

REINFORCING CAGE FOR AN ARMORED CONCRETE ELEMENT

FIELD OF THE INVENTION

The invention relates to a reinforcing cage for an element made of armoured concrete and also covers concrete elements comprising such a cage.

The invention relates especially to the realisation of prefabricated elements of armoured concrete.

BACKGROUND OF THE INVENTION

In the field of construction and civil engineering, construction elements made of moulded concrete in which a metal armouring is imbedded, have been used for a long time.

It is known that the principle of armoured concrete consists in combining the qualities of concrete and of metal armourings. Usually, as indicated on FIG. 1, which illustrates the simple case of a part with rectangular straight section, subject to a load P, it is considered that a part made of armoured concrete comprises, on either side of a neutral axis x'x, two parts subject respectively to compression loads and to tensile loads. The latter are absorbed by a layer of longitudinal bars T whose cross-section is determined in relation to the loads applied and, in the case of a part subject to deflection, in relation to the distance (h) between the facing f1 of the compressed part and the centre of gravity of the armourings in tension T.

Besides, it is necessary to provide as well, in the compressed section, a layer of longitudinal bars that are linked with the bars in tension by transverse armourings, called stirrups enabling, in particular, to sustain shearing loads.

Generally, the reinforcement assembly of a concrete element therefore has the shape of a cage composed of two layers T, C of longitudinal bars respectively active and passive, linked together by stirrups E.

Most often, bars of both armouring layers are superimposed in planes parallel to the direction of the loads and spaced apart from one another, whereas the cage is thus composed of several parallel sections linked together by perpendicular joining bars whereas each section comprises two bars or groups of bars connected by stirrups.

In order to maintain relatively low prices, the armouring bars are produced in very large quantities in specialised facilities that have been arranged for manufacturing round bars of different sections, whereas the said bars can be twisted or corrugated for better adherence.

Going by catalogue, the user has only a limited number of types of bars of different sections available and, in order to obtain the section determined by calculation, it is often necessary to combine two or three attached bars together.

Moreover, the official rules impose to leave a minimum encasing distance between an armouring bar and the corresponding facing of the part, to prevent the concrete from corroding and bursting. Consequently, the armourings must be placed accurately inside the moulded part, while taking into account the diameter of the stirrups surrounding the bars.

When concrete is moulded on site, the first operation consists in laying formworks, called sheetings, which determine both facings of the wall and between which the reinforcing cage is mounted. Then, concrete is cast and it is necessary to wait for the concrete to set and harden before removing the formworks and starting the next building step.

In the case of a slab, the frame is placed on a formwork, then concrete is cast.

To simply the construction and to obtain, moreover, excellent surface quality, it has been suggested for a long time to use prefabricated elements, realised in advance in a workshop especially fitted to that effect. Such a technique is valid, particularly, when a large number of identical parts must be realised, for instance in the building industry.

In this view, so-called heavy prefabrication techniques have been developed in order, for example, to realise standardised facing and floor elements. Indeed, for the construction of buildings, high capacity cranes are available, to install large dimension elements.

However, heavy prefabrication techniques have also been developed in civil engineering since mobile lifting vehicles are now available and enable to handle parts weighing several tons on the site.

For example, the inventor has developed, since 1981, an original technique for constructing conduits buried under an embankment that may provide civil engineering works of certain consequence for road or rail traffic.

In this technique, described in particular in the European patent no 0.081.402, the conduit consists of juxtaposed rings comprising each, as a cross-section, two side elements forming abutment walls and an upper curved element forming a vault resting on the ends of the said abutment walls.

If each ring is given a limited length, for example three meters, the corresponding elements can be placed on their longer side on a road trailer and be transported possibly over a long distance between the prefabrication works and the building site. Indeed, elements can be standardised and it is then profitable to build a factory fitted with moulds that can be used to realise a vast number of civil engineering works up to great distances away from the factory.

In all cases, for the armourings to work under the conditions foreseen by calculations, the said armourings must be positioned accurately inside the moulded part.

When parts are prefabricated in great numbers, the armourings are prepared in advance in specialised factories and delivered to the prefabrication workshop. The reinforcing cage of a prefabricated element must therefore exhibit sufficient rigidity in order to be handled and positioned inside the formwork.

To ensure interconnection of the different sections of a reinforcing cage, the longitudinal bars are generally bound with wire-ties or welded integral with the stirrups.

The realisation of reinforcing cages is therefore a rather delicate operation that must be performed by specialised staff, which increases the global cost of a prefabricated element, with respect to the cost price of metal bars.

Besides the possibilities of realisation depend, obviously, on the weight of the parts and on the lifting possibilities.

The technique for building buried elements described in particular in the patent EP-0.081.402 enables to use parts that are particularly thin with respect to their span. For example, the capacities of mobile cranes that can be used currently on building yards enable to handle upper elements with spans in excess of 10 meters.

Such a heavy prefabrication technique enables to carry out rapidly and cheaply civil engineering works of some importance, but the realisation and transport cost of the prefabricated elements plays a significant role in the cost price of the civil engineering work.

BRIEF DESCRIPTION OF THE INVENTION

The purpose of the invention, without putting into question the calculation of the armouring and their general layout, consists in realising a new type of reinforcing cage that enables, notably to reduce the cost of the prefabricated elements and to increase, for equal weight, the sizes of the parts that conventional lifting vehicles enable to handle.

The invention applies especially to the realisation of civil engineering works consisting of curved prefabricated elements described in the previous patent EP-0.081.402. However, it has appeared that the reinforcing cages thus provided also exhibited advantages for other types of elements and, even, for on-site moulded concrete parts.

The invention therefore relates generally to a reinforcing cage for an armoured concrete element with two facings spaced apart from one another on either side of a neutral axis, between which a reinforcing cage is imbedded, comprising at least two layers of longitudinal armourings, respectively active and passive, substantially parallel, respectively to both facings and connected together by a transverse armouring, whereas each armouring has, as a cross-section, a determined area in relation to the loads to sustain in operation.

According to the invention, each longitudinal armouring consists of a flat iron with rectangular section whose width and thickness are determined in order to provide the area necessary to provide the strength required, with two plane faces, respectively an external face turned toward the corresponding facing and an internal face turned toward the neutral axis, and the transverse linking armouring between two opposite longitudinal armourings, respectively active and passive, consists of at least one elongated metal element, welded alternately on the internal faces of both corresponding flat irons.

According to another particularly advantageous feature, the spacing between the flat irons forming the longitudinal armourings, respectively active and passive, is determined in relation to the loads applied and each facing is placed at a minimum encasing distance from the external face of the corresponding longitudinal flat iron, in order to provide the concrete element with the thickness just necessary to provide the strength required.

Such a reinforcing cage remains conventional in its design and comprises therefore at least two armouring sections centred on planes at right angle to the facings and connected by joining bars. According to the invention, each section comprises at least two longitudinal flat irons spaced from one another and connected together by joining bars consisting of flat bands that cut the said longitudinal flat irons transversely and that are welded to the internal faces of the latter.

In this preferred embodiment, the transverse armourings for maintaining the spacing comprise at least one undulated band, welded alternately on the internal faces of both corresponding longitudinal flat irons of two layers, respectively active and passive.

In another embodiment, the transverse armouring comprises a series of distinct elements, each composed of a portion of band with two bent ends welded respectively on the internal faces of both longitudinal flat irons.

The invention applies especially to the realisation of a reinforcing cage for an element made of armoured concrete with two substantially parallel curved faces. In such a case, the longitudinal flat irons are curved so that their external faces are parallel, respectively to the corresponding facings of the element.

The invention also covers an element made of armoured concrete fitted with such a reinforcing cage and comprising, in a known fashion, two regions, respectively active and passive, on either side of a neutral axis. Each longitudinal bar of the reinforcing cage is then composed of a flat iron with an external face parallel to the corresponding facing of the element and spaced apart from the said facing by a minimum encasing distance (b). Thus, the thickness (H) of the element corresponding to the distance between the facings, respectively active and passive, can be limited to the value:

$$H=h+b+e/2$$

whereas (e) is the thickness of the active longitudinal flat iron and (h) the lever arm between the centre of gravity of the said flat iron and the passive facing of the element.

The invention also covers a method for realising a moulded element made of armoured concrete in which, in order to realise the longitudinal armourings, flat bars with rectangular cross-section are used, whose width and thickness are determined in order to form the area necessary to provide the strength required, whereas the said flat bars are positioned as foreseen for the armourings, respectively active and passive, and connected together by a transverse armouring comprising at least one band-shaped element, welded alternately on the internal faces, turned toward each other, of the said flat bars. The reinforcing cage thus formed is then placed in a mould delineating both facings whose spacing is determined in order to provide the thickness just necessary to maintain a minimum encasing distance between the external face of each longitudinal armouring and the corresponding facing.

But the invention will be understood better with the following description of certain particular embodiments given for exemplification purposes and represented on the appended drawings.

BRIEF DESCRIPTION OF THE FIGURES

FIG. 6 shows, as a cross-sectional view, a reinforcing cage for a prefabricated curved element.

FIG. 7 is a partial cross-sectional view along the line I,I of FIG. 6.

FIG. 8 shows an embodiment variation of the stirrups.

DETAILED DESCRIPTION OF THE INVENTION

Figure 1:
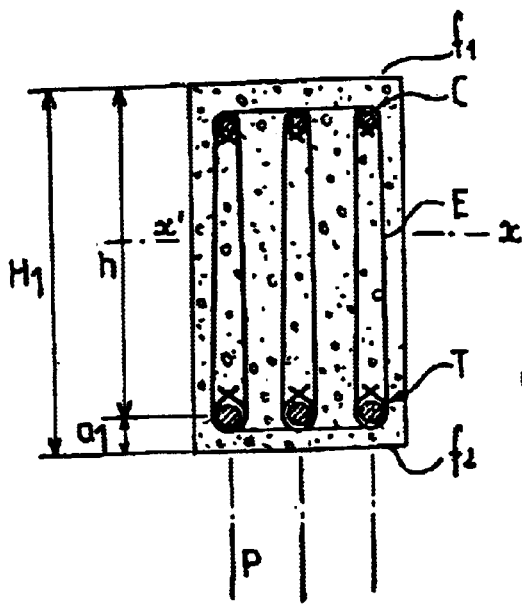
FIG. 1 is a principle diagram of the conventional embodiment of a part made of armoured concrete.

As indicated, FIG. 1 shows the conventional arrangement of the armourings of a concrete element comprising two layers of longitudinal bars C, T, linked by stirrups B. It is known that, usually, the stirrups E are composed of wires with significant diameter, revolving around longitudinal bars as indicated on FIG. 2, which is a detailed view, at enlarged scale, of FIG. 1.

Since metal armourings must be maintained away from the corresponding facing by a minimum encasing thickness (b), the distance between the centre of gravity of a longitudinal bar and the corresponding facing is therefore:

$$a1=D/2+d+b$$

whereas D is the diameter of the armouring, d the diameter of the stirrup and b the minimum encasing thickness.

Still it is known that, in the case for instance of a part subject to bending, it is the lever arm (h), i.e. the distance between the centre of gravity of the armourings in tension and the compressed facing, that plays a part in calculating the strength. The external layer of concrete, along the facing, is used solely for the protection of armourings. The inventor therefore had the idea of reducing the thickness of this external layer in order to reduce the overall thickness H of the element and, consequently, its weight and the quantity of concrete to use.

To this end, the ideas generally admitted for the realisation of reinforcing cages had to be put into question.

Indeed, whereas until now it had appeared normal and, even, inevitable to use concrete round irons that can be found usually in commerce, the inventor realised that the recent evolution of the metallurgical techniques had lowered the prices of flat irons and that the cross section necessary to provide the strength required could be obtained by resorting to thin flat irons connected by bands welded to the opposed internal faces, so that the global thickness of the cage and, consequently, that of the concrete element, can be reduced significantly.

Figure 3:
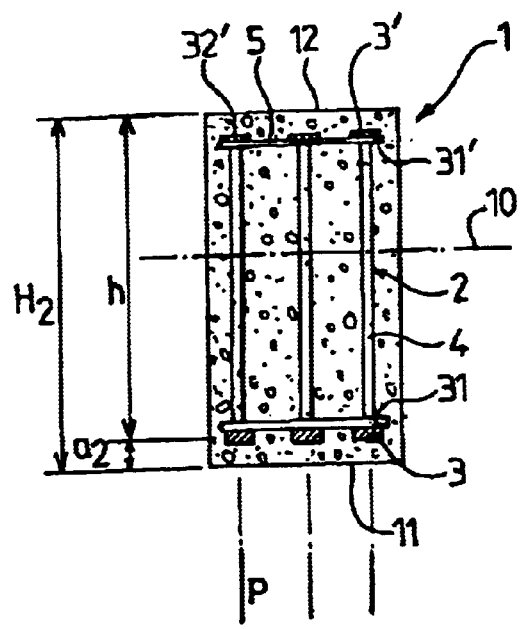
FIG. 3 is a principle diagram of a part made of armoured concrete according to the invention.

FIG. 3, which is a principle diagram analogous to that on FIG. 1, shows a reinforcement element according to the invention in the case of a concrete element 1 with rectangular section having two facings, respectively a stressed face 11 and a compressed face 12. As indicated, each layer of longitudinal armourings comprises at least one flat iron 3 having a rectangular cross section whose area is calculated as for each round bar (T) of FIG. 1.

Similarly, the passive bars (C) of FIG. 1 are replaced with flat irons 3'.

Besides, the stirrups consist of thin bands welded to the faces 31, 31' of the longitudinal flat irons 3, 3' turned to the inside of the part.

Figure 5:
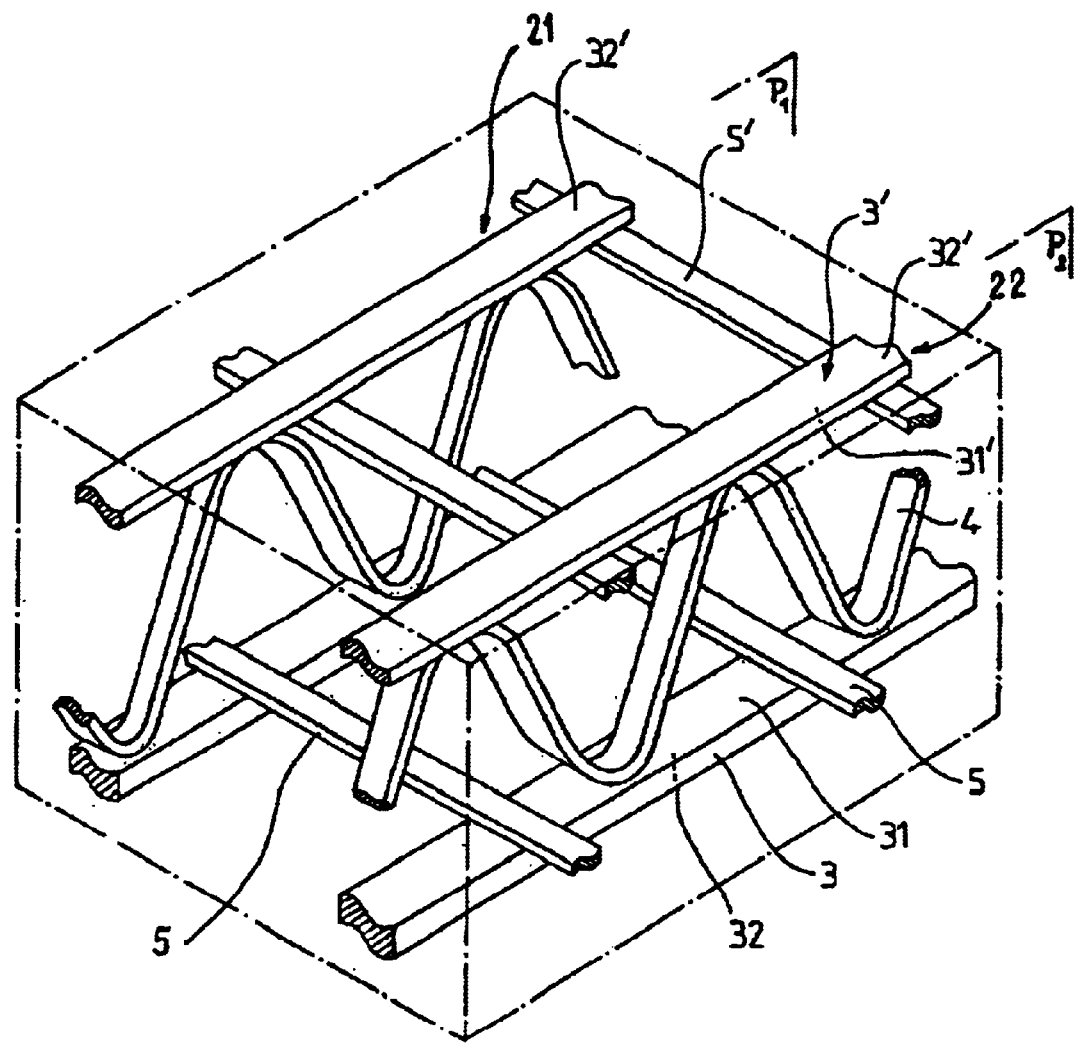
FIG. 5 is a partial view, in perspective, of a reinforcing cage according to the invention.

In a particularly advantageous fashion, each stirrup 4 may be composed of an undulated band whose apexes touch, alternately, the internal faces 31, 1' of two flat irons 3, 3' and are welded to the said faces, as represented on FIG. 5.

As usual, the reinforcing cage 2 is composed of several sections 21, 22 . . . centred on parallel planes (P1, P2 . . . ) at right angle to the neutral axis 10 of the part 1. These different sections are connected together by joining bars parallel to the neutral axis 10, which are advantageously composed of flat bars 5, 5' welded respectively on the internal faces 31, 31' respectively of both longitudinal flat irons 3, 3'. These flat bars 5, 5' pass between the apexes of the undulated band 4, which are welded to the same internal faces 31, 31'.

Figure 4:
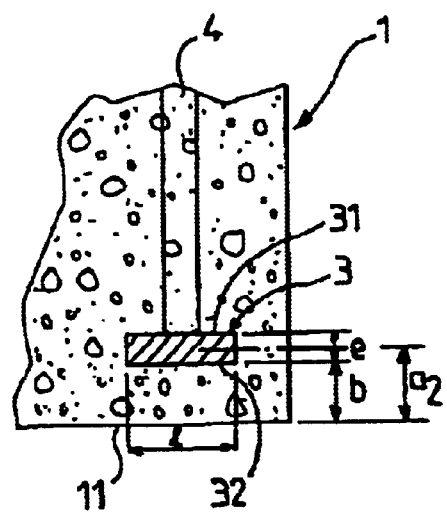
FIG. 4 is a detailed view at enlarged scale of FIG. 3.

In a reinforcing cage thus realised, the stirrups 4 extend therefore solely between the internal faces of the longitudinal flat irons and, as shown on FIG. 4, the distance between the external face 32, 32' of each longitudinal flat iron 3, 3' and the corresponding facing 11, 12 of the part 1 must consequently be only equal to the minimum encasing distance (b).

The distance (a2) between the centre of gravity of the stressed bars 3 with thickness (e) and the corresponding facing 11 is thus:

$$a2 = b + e/2$$

Figure 2:
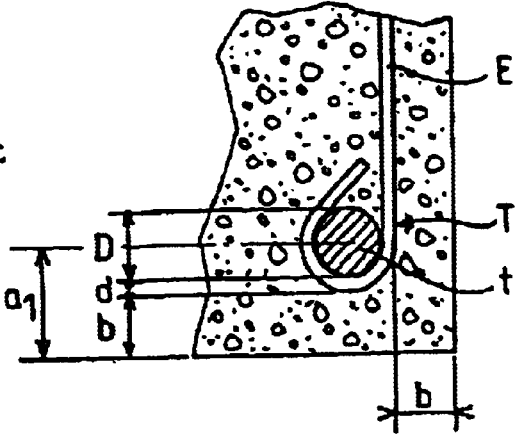
FIG. 2 is a detailed view at enlarged scale of FIG. 1.

If this arrangement is compared to that of FIG. 2, it appears that this distance a2 is smaller than the previous distance a1 since the thickness (d) of the stirrups E is suppressed and that the thickness (e) of a flat iron 3 is smaller than the diameter D of a round bar with the same transverse area.

For a same lever arm (h) corresponding to the loads applied, the total height of the part, $$H2 = h + a2$$

is thus reduced.

For exemplification purposes, as the minimum encasing distance is 30 mm, if we replace a round bar with a diameter of 14 mm associated with stirrups made of 8 mm wires, with a flat iron of equivalent section 25×6, the distance a1 was 45 mm in the conventional layout and the distance a2 will be only 30 mm in the layout according to the invention.

For a same lever arm 4 between the axis of the stressed bars and the compressed facing, the thickness of the girder is therefore reduced by 15 mm with equal strength.

Obviously, it also suffices to leave a minimum encasing distance (b) between the upper faces 32' of the compressed bars 3' and the corresponding facing 12 of the part.

The thickness of concrete can then be reduced at each facing.

It should be noted that the reduction in thickness of the element is proportionally more sensitive for parts already having quite a small thickness with respect to their span as in the case of curved elements used to realise the upper portion of a buried conduit according to the technique described in the patent EP-0.081.402.

A reduction, for instance of 20 mm, in the thickness of each prefabricated element can thus be reflected by significant savings, even for the realisation of a single work.

Generally speaking, the invention thus does not put into question the design and the calculation of the reinforcing cage, whereas the positioning and the sizes, as a cross section, of the armourings are determined conventionally by applying the usual methods of calculation, taking into account the profile of the concrete part to be realised as well as the loads applied.

It should be noted, however, that the use of metallic flat bars as main armourings enables to realise reinforcing cages of quite varied shapes, whereas such flat bars can be shaped easily and, possibly, mass-produced.

For example, to improve the anchoring effect in concrete, the ends of the longitudinal bars are usually curved into crossheads whose curvature radius depends on the diameter of the bar.

The flat irons used, according to the invention, to realise the armouring bars can easily be folded back at their ends, while keeping the same ratio between the curvature radius of the crosshead thus formed and the thickness of the flat iron. As this thickness is smaller than the diameter of an equivalent round bar, the space requirements of the crosshead will be reduced, which may make the realisation of the cage easier.

Similarly, the metal bands 4 forming the linking stirrups between the longitudinal flat irons 3, 3' can be formed easily, for example, in order to sustain the shearing loads as efficiently as possible.

Besides, taking into account the relatively small thickness of the flat irons used, the said flat irons can be delivered to the manufacturing workshop of the armourings in the form of reels, whereas the flat irons are simply unwound and straightened on site according to the requirements.

Besides, a reinforcing cage according to the invention is manufactured more easily than a conventional cage.

Indeed, in the conventional technique, there are only quasi-punctual contacts between the round bars and the stirrups. The links between the different elements to form an integral assembly are made either by wire-ties or, point-by-point, by arc welding and these operations are rather long and costly.

In the case of the invention, conversely, the different elements of the reinforcement are all composed of flat bands whose opposite faces are applied on one another and can be welded easily, for example with pliers. The realisation of a reinforcing cage is therefore easier and calls for less specialised staff. It is thus possible to reduce not only the quantity of concrete to use, but also the manufacturing cost of the reinforcing cage and the global cost of a prefabricated element according to the invention can thus be reduced significantly.

The advantages supplied by the invention compensate therefore easily the price increase of the rods used in a frame according to the invention, with respect to a conventional frame composed of round bars.

Besides, if the concrete round irons form a mass product whose price is relatively low, there are only standardised products available on the market. After having determined the required steel section to absorb the loads applied, it is thus necessary, in the design of the reinforcement, to take into account sections of bars that can be placed by combining, for instance, several bars in order to obtain the requested cross section.

In the case of the invention where metallic flat iron are used, which can be obtained cheaply, for example by splitting sheet metals, it is possible to procure flat irons whose area, in straight section, corresponds exactly to the steel section determined by calculation and the realisation of a cage is easier.

Moreover, the invention benefits from continuous evolution of the manufacturing techniques of the sheet metals that have enabled to reduce the manufacturing costs considerably and, besides, to obtain a very wide variety of products having quite diverse structural features.

In particular, it is now possible to realise economically steel sheets with high elastic limit and the use of flat irons obtained from such sheets will enable to reduce, with equal strength, the quantity of steel necessary to reinforcement. Besides, it is also possible to use steels having an elastic limit perfectly suited to the features of the concrete and, thus, to reduce the risks of cracking.

Moreover, we know that the concrete round irons are particularly sensitive to the risks of corrosion, which justifies a relatively great encasing thickness. The advantages supplied by the invention, enable conversely, to contemplate the use of steels that resist to corrosion better, which would allow reducing the necessary encasing thickness still further and, consequently, the global thickness of the concrete element.

Besides, the expression "flat iron" used in the present description, corresponds to the usual vocabulary but, according to the invention, any type of flat bar having the required strength can be used as reinforcement.

It should be noted, moreover, that for the same cross section, the perimeter of a rectangular flat iron is larger than that of a round bar. The invention enables therefore to improve the adherence between the armourings and the concrete.

Anyway, to improve adherence, it can be contemplated when manufacturing the flat irons, to realise corrugated portions, as for concrete rounds.

Besides, the flat irons constituting the armourings or the metal sheet from which they are formed, can be subject to a surface treatment enabling to improve corrosion strength and/or adherence.

As indicated, the invention applies especially to the realisation of curved prefabricated elements used, for example, to constitute the vault of a passageway buried under an embankment.

As described in the patent EP-0.081.402, such an element represented as a cross section on FIG. 6, comprises two curved facings, respectively a concave intrados face 61 and a convex extrados face 62 that have a cylindrical shape with generatrices parallel to a longitudinal axis of the element, perpendicular to the plane of the figure.

Advantageously, each end 63 of the element exhibits a convex rounded face liable to engage into a concave groove of an abutment wall element, in order to constitute an articulated bearing.

As usual, the reinforcing cage is composed of several parallel sections 60, distributed over the length of the element 6 and connected together by joining bars 5, 5'.

According to the invention, each reinforcing section 60 comprises two longitudinal rods 3, 3' each composed of a flat iron that, in the case of reinforcing a curved element 6 is curved in itself so that, after installation, each flat iron 3, 3' is parallel to the corresponding facing 61, 62.

In each section 60, both flat irons 3, 3' are connected together by an undulated metal band 4, maintaining the space between them.

As shown on FIG. 5, the undulated bands 4 forming the stirrups of two successive sections can advantageously be staggered longitudinally with respect to one another in order to facilitate the penetration of concrete between the various elements of the cage.

The rounded end 63 of the element 6 can be armoured, simply, by a longitudinal rod 64 with flat or round section connected to both layers of the cage by rods or bands 65 welded to the ends, respectively, of two longitudinal flat irons 3, 3' of each section of the cage.

Obviously, the invention is not limited to the details of embodiment that have just been described for exemplification purposes, but also covers the variations still within the protection framework defined by the claims.

For example, the linking stirrups between two reinforcement layers could be made of distinct elements composed of portions of bands 41 with bent ends 42, 42' welded respectively on both flat irons 3, 3' of each section of the cage, as represented on FIG. 8. The space between these elements 41 as well as their tilting angle (A) with respect to the flat irons 3, 3' could also vary in relation to the position of the stirrup in the element and to the calculation of the loads applied.

Besides, we have described the invention in its application to the manufacture of curved elements for the realisation of buried passageways of the type described in the patent EP-0.081.402 that enable to use particularly thin elements with respect to their span. But the invention could also apply to other types of elements such as girders or slabs.

Similarly, if the invention has been developed for the realisation of prefabricated elements, the use of the reinforcing cage of such type would also exhibit advantages in the case of concrete parts moulded on site.

The reference signs inserted after the technical features mentioned in the claims solely aim at facilitating the understanding of the said and do not limit their extent whatsoever.

What is claimed is:

1. A construction element comprising:
    a moulded concrete member having two facings, respectively active and passive, spaced from one another by a preselected distance, and between which is embedded a reinforcing cage having, on either side of a neutral axis, two layers, respectively active and passive, which are separated by a spacing, each layer having at least one longitudinal solid bar of preselected cross-section, said spacing and said cross-section of the bars being determined in relation to loads to be applied, said two layers being respectively parallel to both facings of said moulded element and being connected by transverse linking armouring;

wherein each longitudinal bar of at least one layer of the reinforcing case being a flat bar with two flat faces and having preselected width and thickness, an external face turned towards a corresponding facing and an internal face turned towards the neutral axis, wherein said width and thickness are determined to provide said cross-section of the bar; and wherein said transverse linking armouring includes at least one elongated metal element, welded alternately on the internal faces of two corresponding flat bars, respectively of the active and of the passive layers, and wherein each facing of the molded element is placed at a preselected minimum encasing distance from the external face of the corresponding longitudinal flat bar, in order to provide the construction element with the thickness just necessary to provide a preselected strength; and further wherein the transverse linking armouring between two respectively active and passive longitudinal flat bars comprise at least one undulated band welded alternately on the internal faces of the flat bars.

2. A construction element according to claim 1, further wherein the thickness (H) of the element corresponding to the distance between the facings is equal to:

$$H=h+b+e/2$$

wherein (h) is the distance, calculated in relation to the loads applied between the center of gravity of the said longitudinal flat bar and the facing of the element placed on the other side of the neutral axis;

(b) is a required minimum encasing distance between the external face of the longitudinal flat bar and the corresponding facing of the element and (e) is the thickness of the longitudinal flat bar.

3. A construction element according to claim 1, wherein said reinforcing cage comprises at least two armouring sections centered on planes at right-angles to the facings of the element and connected by joining bars, wherein each section comprises at least two longitudinal flat bars spaced from one another and whereby the joining bars have metal bands transverse to the longitudinal flat bars and are welded to the internal faces of the flat bars.

4. A construction element according to claim 3, wherein the element has two substantially cylindrical curved faces and the longitudinal flat bars of each armouring section are curved so that their external faces are parallel, respectively to the corresponding facings of the element.

5. A construction element according to claim 1, wherein the transverse linking armouring between two respectively active and passive longitudinal flat bars comprise a series of distinct elements each composed of a band with two bent ends respectively on the internal faces of both longitudinal flat bars.

6. A construction element according to claim 1, wherein the element has two substantially cylindrical curved faces and the longitudinal flat bars of each armouring section are curved so that their external faces are parallel, respectively to the corresponding facings of the element.

* * * * *